United States Patent
Lavoie

(10) Patent No.: US 9,998,687 B2
(45) Date of Patent: Jun. 12, 2018

(54) FACE MOUNTED EXTREME ENVIRONMENT THERMAL SENSOR SYSTEM

(71) Applicant: BAE Systems Information and Electronic Systems Integration Inc., Nashua, NH (US)

(72) Inventor: Barry Lavoie, Lowell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 115 days.

(21) Appl. No.: 13/833,172

(22) Filed: Mar. 15, 2013

(65) Prior Publication Data
US 2014/0071294 A1    Mar. 13, 2014

Related U.S. Application Data

(60) Provisional application No. 61/700,070, filed on Sep. 12, 2012.

(51) Int. Cl.
| | |
|---|---|
| H04N 5/225 | (2006.01) |
| H04N 5/33 | (2006.01) |
| G02B 13/16 | (2006.01) |
| G02B 23/12 | (2006.01) |
| G02B 27/01 | (2006.01) |

(52) U.S. Cl.
CPC .............. *H04N 5/33* (2013.01); *G02B 13/16* (2013.01); *G02B 23/125* (2013.01);
(Continued)

(58) Field of Classification Search
CPC .......... G02B 2027/0178; G02B 27/017; G02B 2027/014; G02B 2027/0132; G02B 2027/0138; G02B 2027/0147; G02B 27/144; G02B 27/145; G02B 2027/0143; G02B 2027/0154; G02B 2027/0156; G02B 2027/0159; G06F 3/011; G06F 1/163; G06T 11/00; G06T 19/006; A42B 3/042
See application file for complete search history.

(56) References Cited

U.S. PATENT DOCUMENTS

| | | |
|---|---|---|
| 3,202,150 A | 8/1965 | Miller |
| D208,077 S | 7/1967 | Fountain et al. |
| 3,343,535 A | 9/1967 | Lytle et al. |
| 4,035,845 A * | 7/1977 | Hochwalt ............... A42B 3/10 2/415 |
| D249,368 S | 9/1978 | Watkins, Jr. |
| 4,156,292 A * | 5/1979 | Helm .................... A42B 3/042 2/422 |

(Continued)

FOREIGN PATENT DOCUMENTS

| | | |
|---|---|---|
| EM | 002534990 | 9/2014 |
| EM | 002535021 | 9/2014 |

(Continued)

OTHER PUBLICATIONS

"Infrared Thermal Imaging: See the Unseen," Fisitech (2011).*

(Continued)

*Primary Examiner* — Jay Patel
*Assistant Examiner* — Shadan E Haghani
(74) *Attorney, Agent, or Firm* — Maine Cernota & Radin; Kimberly A.W. Peaslee; Scott J. Asmus

(57) ABSTRACT

A system for the display of thermal imaging data is provided with a hands free thermal imaging camera; a transparent display directly coupled to said thermal imaging camera; a head mounted lens; the display being integrated into the head mounted lens in front of at least one eye of a user.

14 Claims, 11 Drawing Sheets

(52) U.S. Cl.
CPC ......... *G02B 27/017* (2013.01); *H04N 5/2251* (2013.01); *G02B 2027/0138* (2013.01)

(56) References Cited

U.S. PATENT DOCUMENTS

| | | | | |
|---|---|---|---|---|
| 4,653,879 | A | 3/1987 | Filipovich | |
| 4,655,562 | A | 4/1987 | Kreitzer et al. | |
| 4,786,966 | A * | 11/1988 | Hanson | F41G 3/165 224/181 |
| 4,796,987 | A * | 1/1989 | Linden | 351/158 |
| 5,089,914 | A * | 2/1992 | Prescott | A42B 3/042 2/5 |
| 5,187,502 | A * | 2/1993 | Howell | A42B 3/185 2/6.3 |
| 5,200,827 | A | 4/1993 | Hanson et al. | |
| D336,546 | S | 6/1993 | Lybrand | |
| 5,227,769 | A * | 7/1993 | Leksell | A42B 3/042 340/980 |
| 5,245,993 | A * | 9/1993 | McGrady | A42B 1/046 128/201.22 |
| 5,254,852 | A * | 10/1993 | Filipovich | A42B 3/042 250/214 VT |
| 5,341,242 | A * | 8/1994 | Gilboa | G02B 27/0172 359/365 |
| 5,379,140 | A | 1/1995 | Michel et al. | |
| 5,581,271 | A | 12/1996 | Kraemer | |
| D378,610 | S | 3/1997 | Reischel et al. | |
| 5,646,783 | A * | 7/1997 | Banbury | G02B 27/017 359/630 |
| 5,696,521 | A * | 12/1997 | Robinson | G02B 27/017 345/8 |
| D388,872 | S | 1/1998 | Grannis et al. | |
| 5,749,830 | A * | 5/1998 | Kaneko et al. | 600/160 |
| 5,949,582 | A | 9/1999 | Coombs | |
| 6,046,712 | A | 4/2000 | Beller et al. | |
| D431,585 | S | 10/2000 | Vance et al. | |
| 6,160,666 | A | 12/2000 | Rallison et al. | |
| 6,328,031 | B1 | 12/2001 | Tischer et al. | |
| 6,381,749 | B1 * | 5/2002 | Cyr | A42B 3/20 2/426 |
| 6,456,261 | B1 | 9/2002 | Zhang | |
| 6,606,114 | B1 | 8/2003 | Gordon et al. | |
| 6,717,737 | B1 | 4/2004 | Haglund | |
| 6,859,327 | B2 | 2/2005 | Del Bianco et al. | |
| 6,900,777 | B1 | 5/2005 | Hebert et al. | |
| 7,170,058 | B2 * | 1/2007 | Miyano | A42B 3/042 250/330 |
| 7,245,273 | B2 | 7/2007 | Eberl et al. | |
| 7,308,314 | B2 | 12/2007 | Havey et al. | |
| 7,369,174 | B2 | 5/2008 | Olita et al. | |
| 7,460,304 | B1 | 12/2008 | Epstein et al. | |
| 7,586,686 | B1 * | 9/2009 | Hall | G02B 5/1814 359/558 |
| 7,859,562 | B2 | 12/2010 | Igarashi et al. | |
| 7,969,383 | B2 | 6/2011 | Eberl et al. | |
| D700,928 | S | 3/2014 | Lavoie | |
| D700,962 | S | 3/2014 | Lavoie | |
| D702,831 | S | 4/2014 | Lavoie | |
| D704,327 | S | 5/2014 | Lavoie | |
| D704,328 | S | 5/2014 | Lavoie | |
| D706,414 | S | 6/2014 | Lavoie | |
| D720,632 | S | 1/2015 | Lavoie | |
| 9,128,281 | B2 * | 9/2015 | Osterhout | G02B 27/017 |
| 9,609,902 | B2 * | 4/2017 | Waters | A42B 1/24 |
| 2001/0010225 | A1 * | 8/2001 | Keller | A62B 9/006 128/201.25 |
| 2002/0092522 | A1 * | 7/2002 | Fabin | A62B 17/04 128/201.23 |
| 2002/0129818 | A1 * | 9/2002 | Morgan | A62B 18/08 128/206.26 |
| 2002/0139366 | A1 * | 10/2002 | Gaschke | A62B 9/003 128/201.13 |
| 2002/0139371 | A1 * | 10/2002 | Prete | A62B 9/04 128/206.21 |
| 2002/0163486 | A1 * | 11/2002 | Ronzani et al. | 345/87 |
| 2003/0058100 | A1 * | 3/2003 | Jumpertz | A42B 3/0433 340/540 |
| 2003/0058544 | A1 * | 3/2003 | Bianco | A42B 3/042 359/630 |
| 2003/0122958 | A1 | 7/2003 | Olita et al. | |
| 2004/0049825 | A1 * | 3/2004 | DeHaan | A42B 3/20 2/6.7 |
| 2004/0244801 | A1 * | 12/2004 | Hannah | A62B 18/08 128/207.11 |
| 2005/0091732 | A1 * | 5/2005 | Howard | A42B 3/14 2/424 |
| 2005/0114986 | A1 * | 6/2005 | Hobart | A42B 3/26 2/171.3 |
| 2005/0167590 | A1 * | 8/2005 | Miyano | A42B 3/042 250/330 |
| 2005/0177594 | A1 * | 8/2005 | Rajan | G06F 17/30067 |
| 2006/0115130 | A1 * | 6/2006 | Kozlay | 382/117 |
| 2007/0081119 | A1 * | 4/2007 | Mayer | G02C 7/08 351/45 |
| 2007/0091448 | A1 * | 4/2007 | Durner | G02B 23/125 359/631 |
| 2007/0132943 | A1 * | 6/2007 | Kurzrok | G02C 7/12 351/47 |
| 2008/0013037 | A1 * | 1/2008 | Carollo | G02B 27/0176 351/41 |
| 2008/0186447 | A1 * | 8/2008 | Davis | A62B 18/02 351/158 |
| 2008/0266669 | A1 * | 10/2008 | Durner | G02B 27/017 359/630 |
| 2009/0073330 | A1 * | 3/2009 | Viala | G06Q 10/107 349/11 |
| 2009/0184889 | A1 * | 7/2009 | Kier | G02B 5/32 345/8 |
| 2009/0307828 | A1 | 12/2009 | Ludlow | |
| 2010/0064405 | A1 * | 3/2010 | McGovern | A42B 3/225 2/6.7 |
| 2010/0091377 | A1 * | 4/2010 | Hedges | A42B 3/04 359/630 |
| 2010/0302356 | A1 * | 12/2010 | Sinivaara | G02B 27/017 348/61 |
| 2011/0113519 | A1 * | 5/2011 | Gendron | G02C 3/02 2/2.5 |
| 2011/0122051 | A1 * | 5/2011 | Choi | G02B 27/0172 345/8 |
| 2011/0283431 | A1 * | 11/2011 | Miller, IV | A42B 3/226 2/10 |
| 2012/0075168 | A1 * | 3/2012 | Osterhout et al. | 345/8 |
| 2012/0117717 | A1 * | 5/2012 | McGinn | A42B 3/04 2/424 |
| 2012/0235902 | A1 * | 9/2012 | Eisenhardt | A42B 3/042 345/156 |
| 2012/0306725 | A1 * | 12/2012 | Hilkes | G09G 5/00 345/8 |
| 2013/0180523 | A1 * | 7/2013 | Huggins | A62B 9/006 128/202.22 |
| 2013/0283508 | A1 * | 10/2013 | Durham | A42B 3/227 2/422 |
| 2014/0250571 | A1 * | 9/2014 | Pippillion | A42B 3/125 2/414 |

FOREIGN PATENT DOCUMENTS

| | | |
|---|---|---|
| EP | 0 691 559 A1 | 10/1996 |
| EP | 13 83 7453 | 2/2016 |
| GB | 2 259 211 A | 3/1993 |
| JP | 2011-145578 | 7/2011 |

OTHER PUBLICATIONS

PCT Search Report for PCT Appl. No. PCT/US2013/058000 dated Dec. 19, 2013, 8 pgs.

Survivair SCBA: Business & Industrial I eBay. (n.d.). Electronics, Cars, Fashion, Collectibles, Coupons and More Online Shopping I

(56) References Cited

OTHER PUBLICATIONS eBay. Retrieved Oct. 14, 2013, from http://www.ebay.com/bhp/survivair-scba 8 pgs
OES Products Group. (n.d.). OES Products Group. Retrieved Oct. 14, 2013, from http://www.lheoesgroup.com/ 3 pages.
Air Soft Extreme. (n.d.). Air Soft Extreme. Retrieved Oct. 14, 2013, from www.airsoftextreme.com/store/index.php?main page=producUnfo&cPath=254_ 671 &products id=6793&zen id=osl8ng6c6pmdvk5be62nOdem50 3 pgs.
MSA MSA Ultra Elite(TM) SCBA Respirator, S—Full Face Respirators—4AFU9110084690—Grainger Industrial Supply. (n.d.). Grainger Industrial Supply—MRO Supplies, MRO Equipment, Tools & Solutions. Retrieved Oct. 14, 2013, from http://www.grainger.com/Grainger/MSA-Full-Face-Respirator-4AFU9 4 pgs.
Drager FPS-COM-PLUS. (n.d.). Home. Retrieved Oct. 14, 2013, from http://www.draeger.com/sites/enus_us/Pages/Oil-Gas-Industry/Draeger-FPS-COM-PLUS.aspx 3 pgs.
Arayem Trade—Scott Sabre self contained breathing apparatus. (n.d.). ARAYEM Trade—Home. Retrieved Oct. 14, 2013, from http://arayemtrade.com/sabre_selCc ontained_breathing_apparatus 13 pgs.
Paul Ridden, "World First GPS Goggles With Head Mounted Display," Wearable Electronics, Oct. 8, 2010. 9 pgs.

\* cited by examiner

FACE MOUNTED EXTREME ENVIRONMENT THERMAL SENSOR SYSTEM

RELATED APPLICATIONS

This application claims the benefit of U.S. Provisional Application No. 61/700,070, filed Sep. 12, 2012. This application is herein incorporated by reference in its entirety for all purposes.

FIELD OF THE INVENTION

The invention relates to sensors, and more particularly, to a head mounted sensor used in extreme environments.

BACKGROUND OF THE INVENTION

A number of thermal sensor systems are known which are used for various firefighting, military, and industrial purposes. Often these systems are hand held, encumbering the user, or are subject to other deficiencies including allowing smoke, particles and debris between the user's eye and the sensor unit display, lack of parallax correction, and partial obstruction of vision of the applicant. What is needed, therefore, are techniques for providing an improved lightweight, low cost, hands free system or providing real-time thermal intelligence through smoke and extremely harsh, high-temperature environments.

SUMMARY OF THE INVENTION

One embodiment of the present invention provides a system for the display of thermal imaging data, the system comprising: a thermal imaging camera; a transparent display directly coupled to the thermal imaging camera; a head mounted lens; the display being integrated into the head mounted lens in front of at least one eye of a user.

Another embodiment of the present invention provides such a system wherein the thermal imaging camera is disposed centrally on the lens.

A further embodiment of the present invention provides such a system wherein the display is disposed in front of only one eye.

Still another embodiment of the present invention provides such a system wherein the thermal imaging camera is disposed on an outboard side of the display.

A still further embodiment of the present invention provides such a system further comprising at least one fenestration in the lens in which the display many be disposed.

Yet another embodiment of the present invention provides such a system wherein the display is sealed to the lens closing the fenestration.

A yet further embodiment of the present invention provides such a system further comprising a lens insert whereby the position of the display within the fenestration may be changed.

Even another embodiment of the present invention provides such a system wherein the thermal imaging camera is an Infrared sensor.

An even further embodiment of the present invention provides such a system wherein the display is disposed in front of both eyes of eyes user.

Yet still another embodiment of the present invention provides such a system wherein the lens is configured to protect the display from hostile environmental conditions.

A yet still further embodiment of the present invention provides such a system wherein the system is exclusively head mounted.

Even yet another embodiment of the present invention provides such a system where the system is hands free.

An even yet further embodiment of the present invention provides such a system wherein the head mounted lens is sealed to a face of the user.

Even still another embodiment of the present invention provides such a system where brightness of the transparent display may be controlled by a user when in operation.

An even still further embodiment of the present invention provides such a system wherein an image displayed by the transparent display is moved vertically/horizontally by shifting the pixels on horizontal or vertical axis by a user to align the image to the user's eye.

Even yet still another embodiment of the present invention provides such a system further comprising a storage device whereby video from the system is recorded and stored.

An even yet still further embodiment of the present invention provides such a system wherein the transparent display displays messages transmitted to a user.

One embodiment of the present invention provides such a system wherein video is transmitted in real time to an external viewer.

Another embodiment of the present invention provides such a system wherein opacity of the transparent display is adjustable by the user.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One embodiment of the present invention provides a thermal sensor system which is integrated into a face mounted goggle or shield. The package withstands extremely high temperatures and harsh environments. The sensor data transmits real-time to a display system which is also packaged into the same goggle, which in one embodiment is sealed to the user's face. In one embodiment, the display is flexible and covers both eyes, and is configured to fit comfortably on the face, while in others the display may be configured to be configured to cover only one of the user's eyes. The goggle may comprise part of a larger face shield which may include a respirator apparatus or other equipment. In one embodiment, the data also is sent wirelessly to a remotely located operator who can supervise the activity the goggle operator is seeing. Such remote viewing will help a search and rescue team see what the operator is seeing, and help coordinate and direct the operators mission if necessary as well as record the current events.

Figure 1:
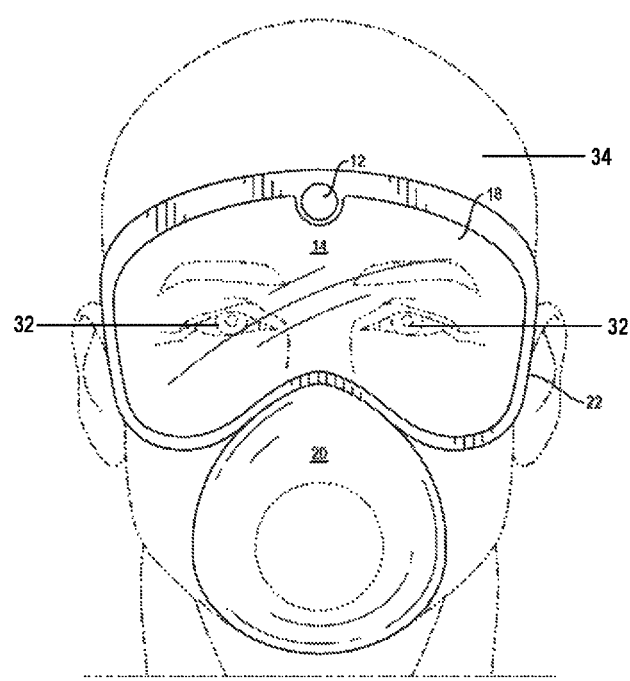
FIG. 1 is a front elevation view illustrating a goggle with integrated thermal sensor configured in accordance with one embodiment of the present invention on a user's head.
Figure 2:
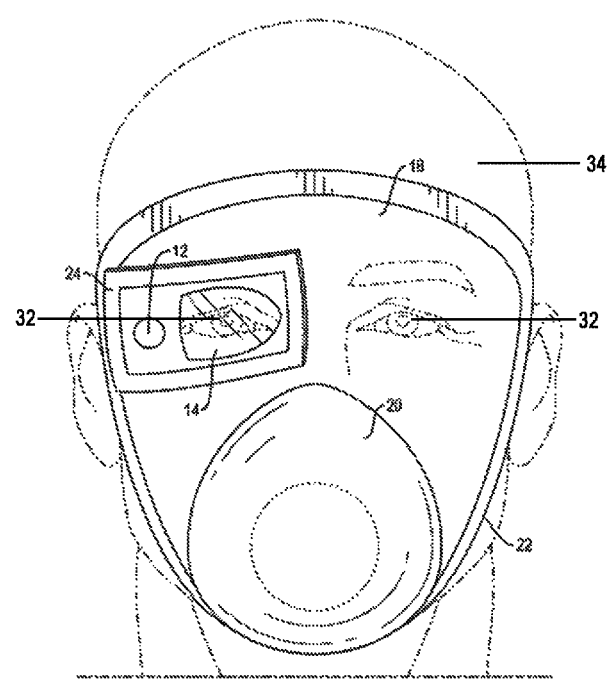
FIG. 2 is a front elevation view illustrating a face shield with integrated thermal sensor configured in accordance with one embodiment of the present invention on a user's head.
Figure 3:
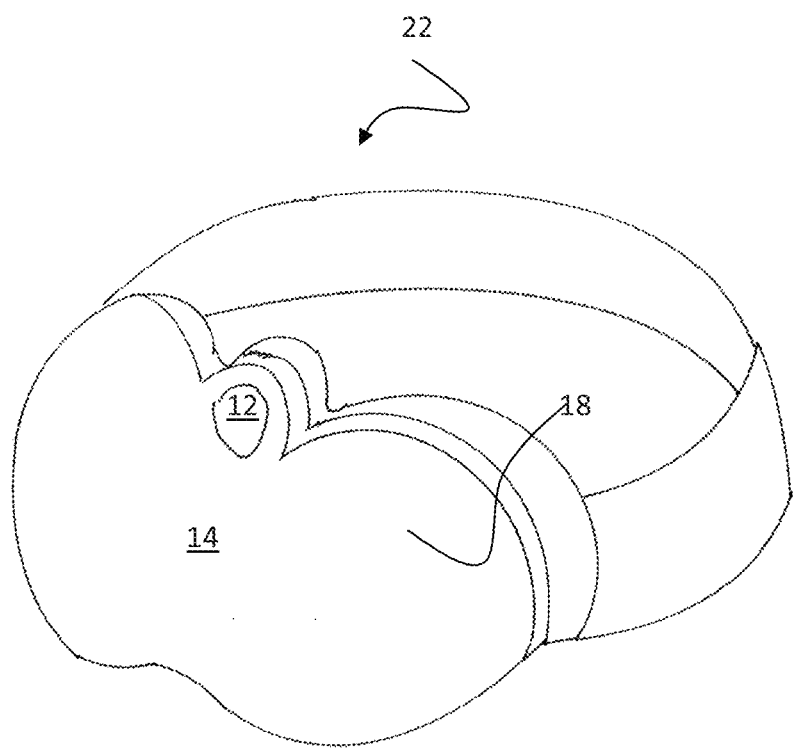
FIG. 3 is a front perspective view illustrating a goggle with integrated thermal sensor configured in accordance with one embodiment of the present invention.
Figure 4:
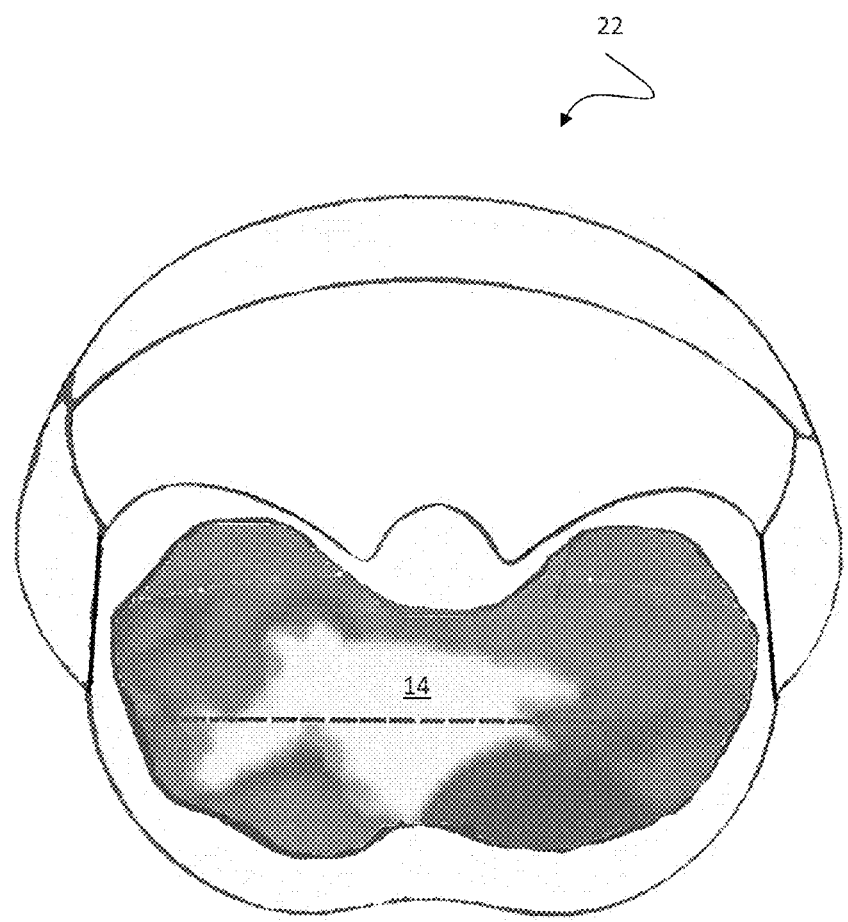
FIG. 4 is an interior perspective view illustrating a goggle with integrated thermal sensor configured in accordance with one embodiment of the present invention showing a composite thermal/visible light image.

Referring to FIGS. 1-4, it will be appreciated that this goggle-like IR sensor is face mounted and is capable of hands-free operation. In such embodiments, the sensor, in one embodiment a thermal imaging camera 12 is disposed proximate to a display 14 which is itself mounted on the user's head 34 and disposed proximate to at least one of the user's eyes 32. The display 14 of one embodiment of the present invention is a transparent display allowing the user to see through the display 14 while, as in FIG. 4, seeing and overlay of the IR image 16 which still allows the user to see visible images. In one embodiment, illustrated in FIG. 1, the see through display 14 may be provided across both eyes 32, while in that of alternative embodiments such as that illustrated in FIG. 2, the display 14 may be provided for only a single eye (monocular). The display 14 may be integrated into a lens 18 of a face shield or goggles 22 as illustrated in FIG. 3. In some embodiments it may be advantageous to impart flexibility to the display to allow the goggles 22 to better conform to the user's face. The sensor 12 identifies objects in a smoke-filled environment. Sensor hardware 12, according to various embodiments maybe integrated into a face mounted goggle/mask such as those currently being used in both military and domestic firefighting. Such goggles or masks may be fitted with ventilators 20. As in FIG. 1, the camera 12 may be mounted centrally, or as in FIG. 2 mounted to the outboard side of the display 14. In both configurations maintaining the camera 12 in close proximity to the display 14 minimizes parallax distortion and improves depth perception by the user.

Figure 5:
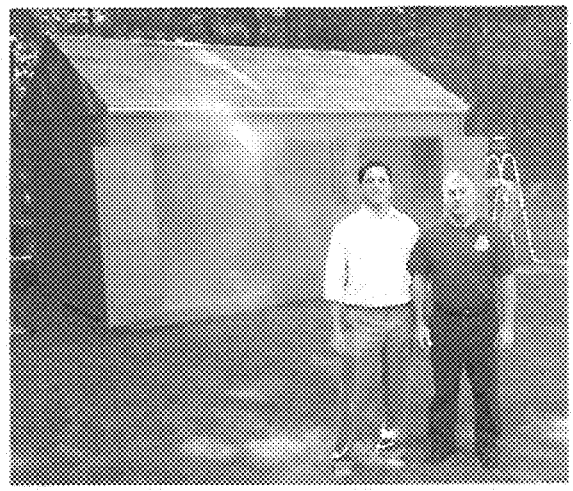
FIG. 5A is a visible light image of a test location.
FIG. 5B is a thermal image of a test location presented to the user in grey scale.
FIG. 5C is a thermal image of a test location presented to the user in color enhancement.
Figure 5:
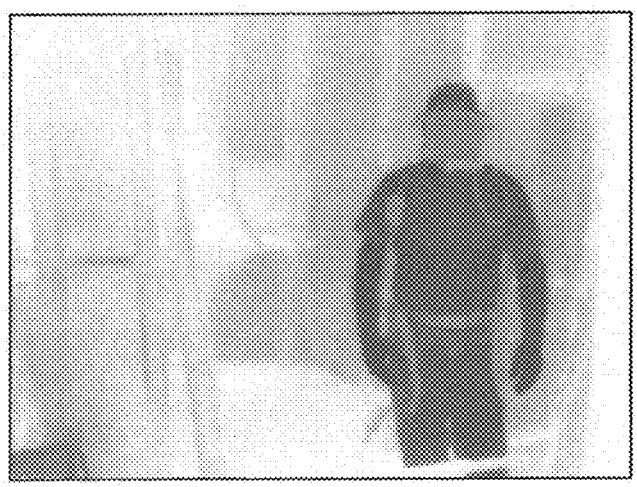
Figure 5:

Referring to FIGS. 5A-5C, photographs showing the result of a test are shown. FIG. 5A is a photograph showing a test site as seen in visible light. FIG. 5B is a photograph taken with a monochrome standard black hot thermal imaging setting. FIG. 5C is a default RGB converted download image utilizing commercial software.

Figure 6:
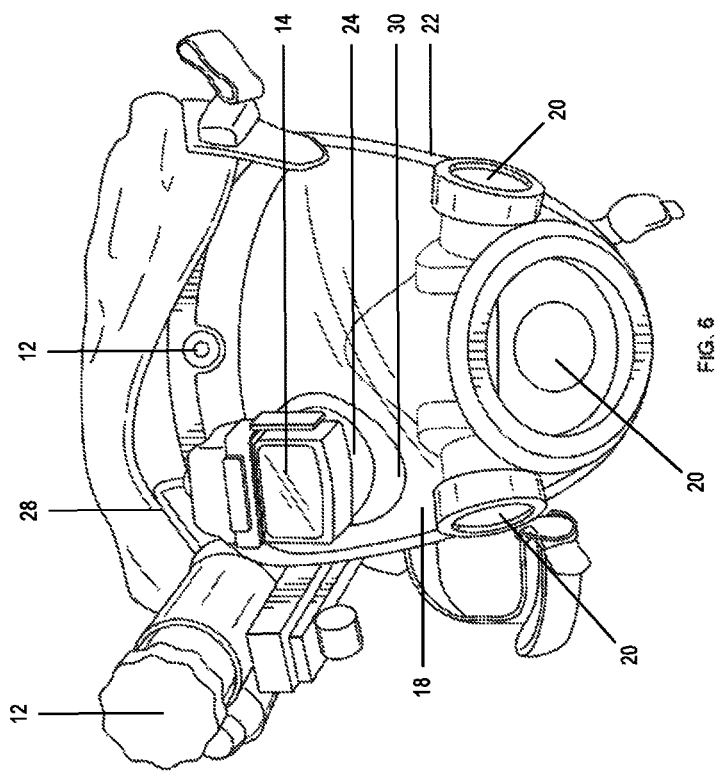
FIG. 6 is a front view photograph illustrating a face shield with integrated thermal sensor configured in accordance with one embodiment of the present invention.
Figure 7:
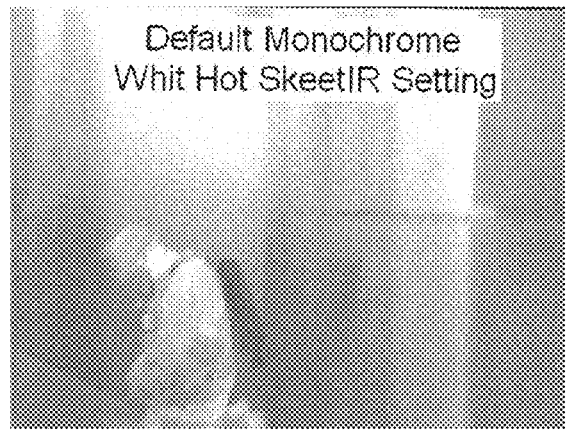
FIG. 7A is a thermal image of a test location presented to the user in monochrome image.
FIG. 7B is a thermal image of a test location presented to the user in RGB colormap conversion.
FIG. 7C is a thermal image of a test location presented to the user in colormap 1.
FIG. 7D is a thermal image of a test location presented to the user in colormap 2.
FIG. 7E is a thermal image of a test location presented to the user in colormap 3.
FIG. 7F is a thermal image of a test location presented to the user in colormap 4.
Figure 7:
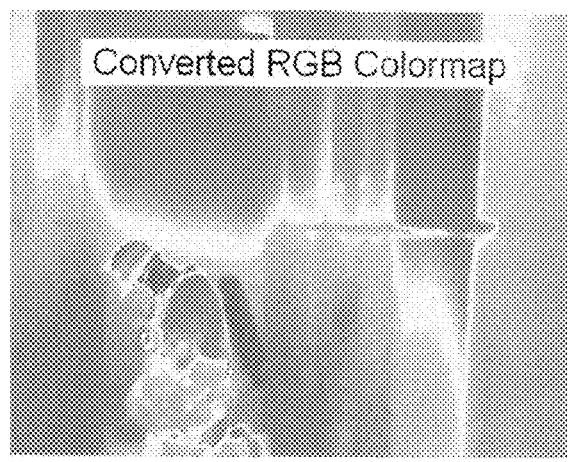
Figure 7:
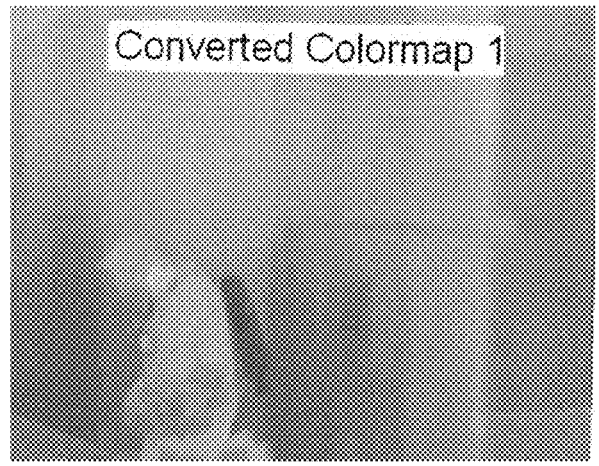
Figure 7:
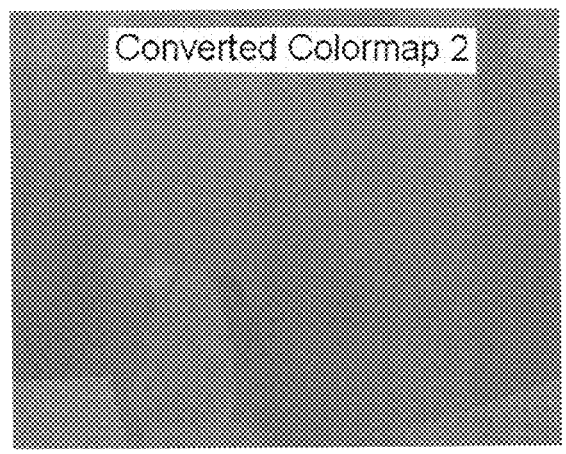
Figure 7:
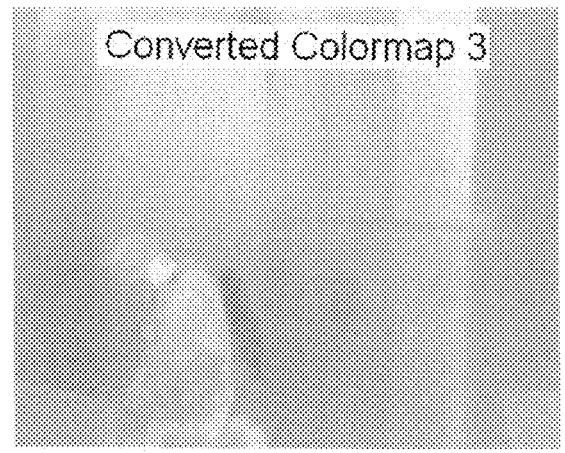
Figure 7:
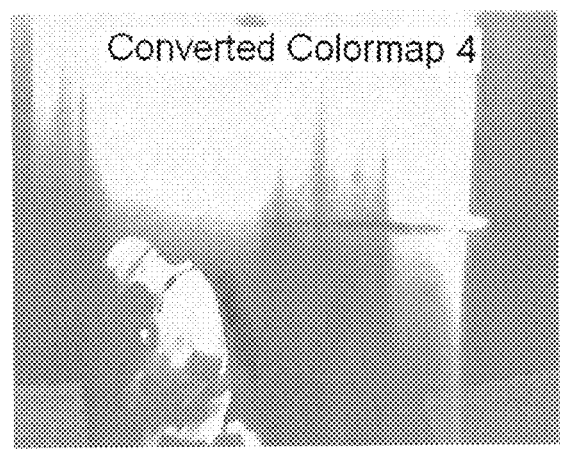

Referring to FIG. 6, a system configured according to one embodiment of the present invention. An IR sensor system 12, in one embodiment a system sold by the BAE Systems under the trademark SkeetIR and included brightness controls are head mounted and affixed to a firefighting face mask 22. The sensor 12 is connected by direct wiring 28 to a transparent display 14, such as that described in U.S. Pat. No. 7,586,686, which is herein incorporated by reference for all purposes in its entirety. In such a system the display 14 and the sensor 12 are mounted on the shield proximate to an eye of a user. The display, in such a configuration, is sealed 30 to the face piece or lens 18 to prevent, inter alia, the entrapment of smoke, fumes, particulates, and debris between the lens 18 and the display 14. One skilled in the art will appreciate that a variety of seal 30 materials and techniques are within the claimed invention, including but not limited to gaskets, and adhesive seals.

Referring to FIGS. 7A-7F photographs showing the results of another test of one embodiment of the apparatus of the invention as shown. As illustrated in these figures, one embodiment of the present invention allows images to be displayed to the user in both color and grey scale.

Figure 8A:
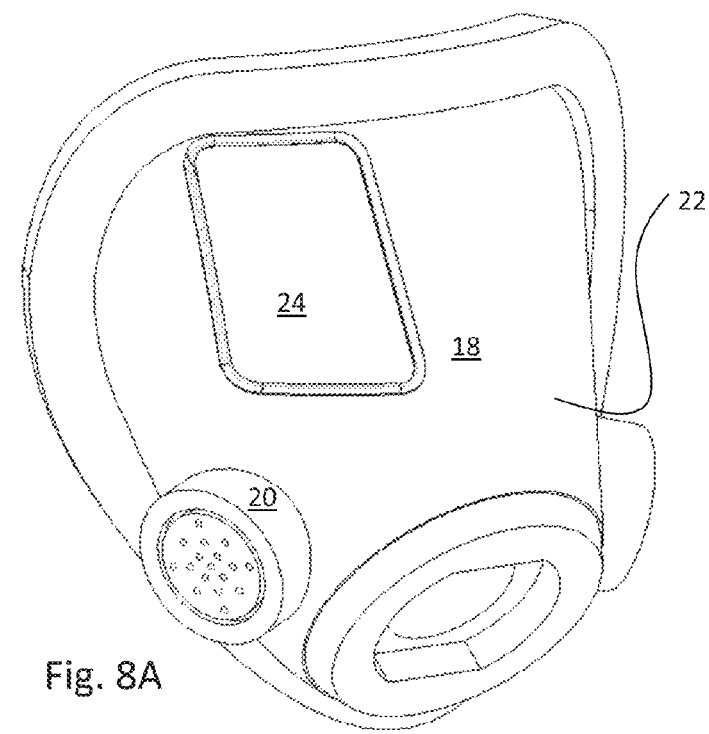
FIG. 8A is a front perspective view illustrating a face shield with an unused aperture for an integrated thermal sensor configured in accordance with one embodiment of the present invention.
Figure 8B:
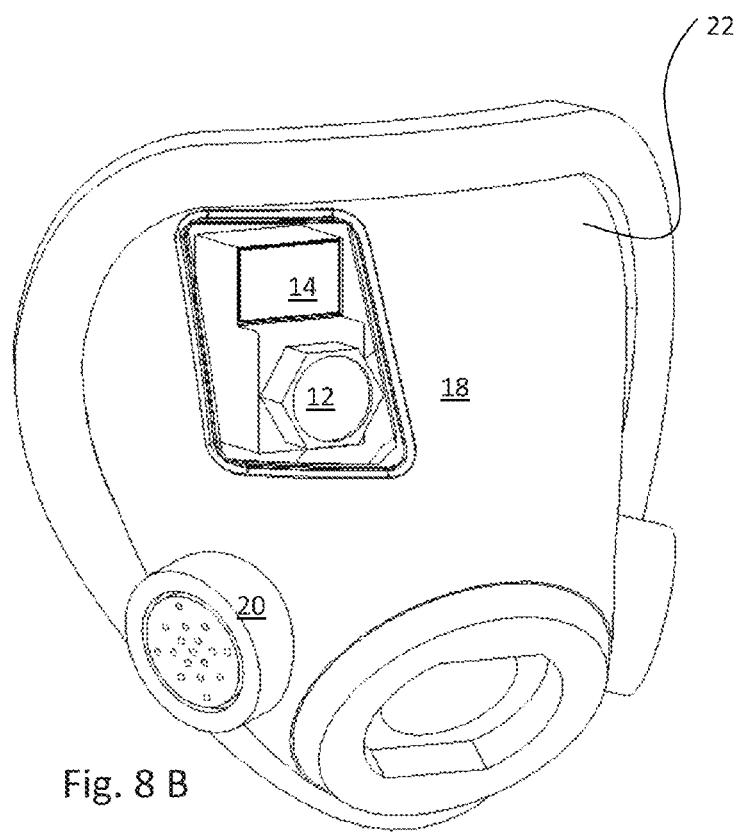
FIG. 8B is a front perspective view illustrating a face shield with an aperture in which is disposed an integrated thermal sensor configured in accordance with one embodiment of the present invention.
Figure 9A:
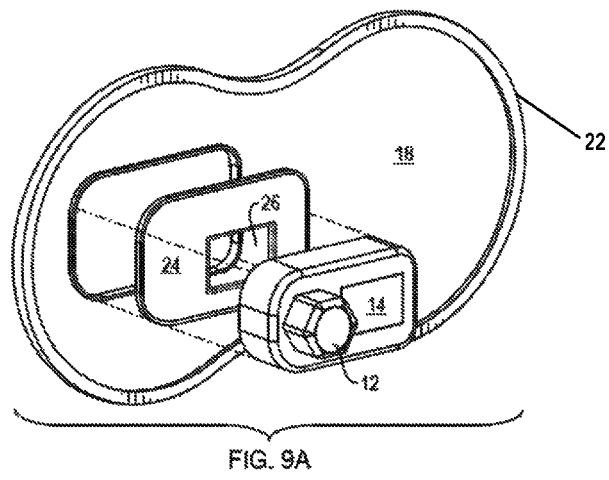
FIG. 9A is a front perspective, exploded view illustrating a goggle with an aperture and insert for an integrated thermal sensor configured in accordance with one embodiment of the present invention.
Figure 9B:
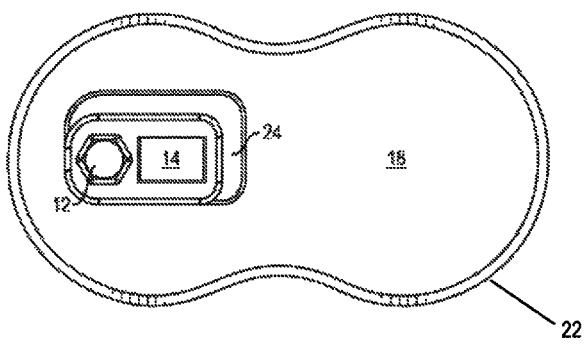
FIG. 9B is a front elevation view illustrating a goggle with an aperture and insert for an integrated thermal sensor configured in accordance with one embodiment of the present invention.
Figure 10A:
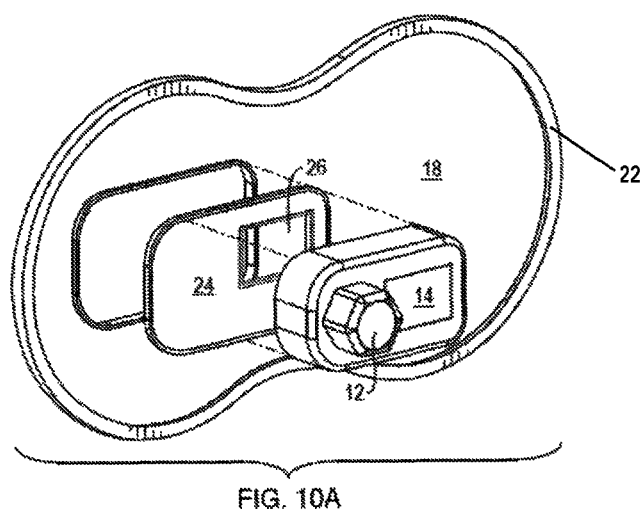
FIG. 10A is a front perspective, exploded view illustrating a goggle with an aperture and insert for an integrated thermal sensor configured in accordance with one embodiment of the present invention.
Figure 10B:
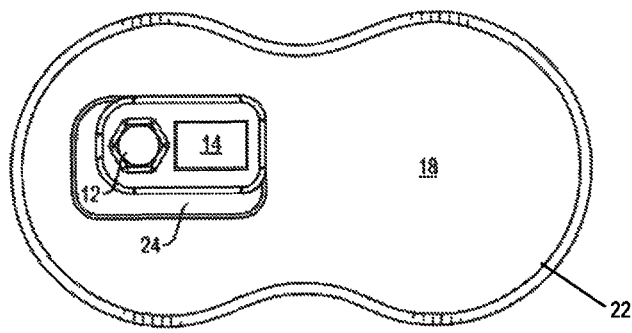
FIG. 10B is a front elevation view illustrating a goggle with an aperture and insert for an integrated thermal sensor configured in accordance with one embodiment of the present invention.

Referring to FIGS. 8A and 8B, illustrate alternative face shield configured to allow for the substitution of a lens insert 24 into the lens 18 when a IR sensor 12 may not be required. The alternative face shield in FIGS. 8A and 8B without and with an IR camera is shown. A lens insert 24 may be configured, either in FIG. 8A to occlude an opening in a mask which is not occupied by a camera and display, or to accommodate a variety of placements of the imaging system (inclusive of both the cameral 12 and the display 14) proximate to the user's eye. This allows the user to adjust the unit to accommodate exit pupil diameters and facial dimensions of various users. An embodiment where inserts with differently positioned fenestration 26 are illustrated in FIGS. 9A and 9B and 10A and 10B. FIGS. 9A and 10A illustrate prospective exploded views of the embodiment, while FIGS. 9B and 10B illustrate front elevation views. Similarly, both sides of the lens 18 may be configured to receive inserts.

In one embodiment, the system provides users with full vision through any smoke filled environment, thus it reduces search and rescue time in harsh environments. The system of one embodiment is fully sealed to a lens which can be fully sealed to the users face, or to another lens, for instance a set of goggles worn outside a firefighting mask. Use of a transparent see-through display by one embodiment of the present invention allows for full vision when not in use. See-through display creates fused image of visible/thermal scene when in use. Brightness settings of thermal scene being displayed may be decreased/increased when in use to allow more/less of the visible scene come through to the user's eye, allowing the user to adjust opacity of the system. Alternatively, the user can use their hand or clip on the backdrop of the image or tint the backdrop to eliminate viewing the visible scene through the see-though display when in use. (i.e. if it is real bright outside, and the user wants to eliminate the ambient light, they may want to do this.)

The image being displayed by such an embodiment can be moved vertically/horizontally by shifting the pixels left/right and/or up and down to align the image to the user's eye. This is an alternative way to eliminate parallax. The system of one embodiment can record video of what user is seeing which can be saved on board and downloaded or transmitted wirelessly. The system can receive data wirelessly and display the information received on the transparent see-through display. The power source can be a rechargeable/removable battery. In an alternative embodiment, the system does not need to have an integrated power source, instead a connector can be provided instead to accept power from other apparatus to which it is connected. (i.e. the system can be connected to an oxygen mask used in firefighting and the power to the camera can be provided via a cable from the mask apparatus.)

The user can focus the thermal imager to accommodate a wide range of thermal scene distances. (i.e. the user may go into a smoke filled building and want to look down a long hallway, or, make sure they can navigate through a living room clearly seeing objects directly in front of them.) The imaging camera can be located to the left, right, above or below the user's eye when a one eye system is being used. The system, in some embodiments, can be coupled to other sensors to display additional information on the transparent see-through display. (i.e. hyperspectral sensor, low-light visible sensors, radar sensors). If additional sensors are coupled to this system and additional data is displayed on the see-through transparent display, the image data can be overlaid to eliminate parallax within the displayed image data.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the display of thermal imaging data in a unitary face mounted mask, the system comprising:
 a head mounted thermal imaging camera, wherein said thermal imaging camera is an infrared sensor;
 a transparent display disposed proximate to said thermal imaging camera and directly coupled to said thermal imaging camera, wherein said thermal imaging camera is disposed on an outboard side of said display, wherein said thermal imaging camera is connected by direct wiring to the transparent display;
 a head mounted protective lens;
 said transparent display being integrated into said head mounted protective lens and fixed in position in front of at least one eye of a user;
 a respirator apparatus, wherein the respirator apparatus is fitted on said head mounted protective lens;
 a lens insert in the head mounted protective lens; and
 at least one fenestration in said lens insert whereby the position of said transparent display within said fenestration may be changed;
 wherein said head mounted protective lens with said transparent display and the respirator apparatus form the unitary face mounted mask that is configured to be sealed around a user's face;
 and wherein brightness of said transparent display is controllable by a user when in operation.

2. The system of claim 1 wherein said transparent display is disposed in front of only one eye.

3. The system of claim 1 wherein said transparent display is sealed to said insert lens closing said fenestration.

4. The system of claim 1 wherein said display extends across the face piece and is disposed in front of both eyes of the user.

5. The system of claim 4 wherein said lens is configured to protect said display from hostile environmental conditions.

6. The system of claim 1 where said system is hands free.

7. The system of claim 1 wherein an image displayed by said transparent display is moved vertically/horizontally by shifting the pixels on horizontal or vertical axis by a user to align the image to said users eye.

8. The system of claim 1 further comprising a storage device whereby video from said system is recorded and stored.

9. The system of claim 1 wherein said transparent display displays messages transmitted to a user.

10. The system of claim 1 wherein video is transmitted in real time to an external viewer.

11. The system of claim 1 wherein opacity of said transparent display is adjustable by said user with multiple settings.

12. The system of claim 1 wherein said thermal imaging camera can be detached from said head mounted protective lens and used in a hand held application.

13. The system of claim 1 wherein said thermal imaging camera is mounted on one side of said head mounted protective lens and said transparent display is mounted on the opposite side of said head mounted protective lens.

14. A firefighting mask having a display of thermal imaging data,
 the firefighting mask comprising:
 a thermal imaging camera mounted on the firefighting mask, wherein said thermal imaging camera is an infrared sensor;
 a see through protective lens disposed about the firefighting mask;
 a transparent display mounted to the see through protective lens and disposed in front of at least one eye of a user;
 a ventilator fitted to the see through protective lens;
 a lens insert in the see through protective lens; and
 at least one fenestration in said lens insert whereby said transparent display is placed within said fenestration thereby sealing said fenestration;
 wherein said see through protective lens, transparent display and the ventilator form a unitary face mounted mask that is configured to be sealed about a user's face permitting use in high temperatures and harsh environments to prevent entrapment of smoke, fumes particulates and debris between the see through lens and the transparent display;

and wherein the thermal imaging camera is mounted on one side of the see through protective lens and said transparent display is mounted on an opposite side of the see through protective lens and the thermal imaging camera is connected by direct wiring to the transparent display for viewing.

* * * * *